US007610155B2

(12) United States Patent
Timmis et al.

(10) Patent No.: US 7,610,155 B2
(45) Date of Patent: Oct. 27, 2009

(54) METHODS FOR PROCESSING SPECTRAL DATA FOR ENHANCED EMBRYO CLASSIFICATION

(75) Inventors: Roger Timmis, Olympia, WA (US); Mitchell R. Toland, Puyallup, WA (US)

(73) Assignee: Weyerhaeuser NR Company, Federal Way, WA (US)

( * ) Notice: Subject to any disclaimer, the term of this patent is extended or adjusted under 35 U.S.C. 154(b) by 698 days.

(21) Appl. No.: 11/297,919

(22) Filed: Dec. 8, 2005

(65) Prior Publication Data

US 2006/0143731 A1    Jun. 29, 2006

Related U.S. Application Data

(60) Provisional application No. 60/639,995, filed on Dec. 28, 2004.

(51) Int. Cl.
*G01N 33/48* (2006.01)
*G01N 33/50* (2006.01)

(52) U.S. Cl. .............................. 702/19; 700/29; 702/32; 702/179; 703/2; 703/11; 706/20; 706/22

(58) Field of Classification Search ........................ None
See application file for complete search history.

(56) References Cited

FOREIGN PATENT DOCUMENTS

WO       WO 99/63057      * 12/1999

OTHER PUBLICATIONS

Timmis R et al., "Use of Visible and Near-Infrared Reflectance Spectra for Selection of Germination-Competent Somatic Embryos," Dec. 2004.

* cited by examiner

*Primary Examiner*—Carolyn L. Smith
(74) *Attorney, Agent, or Firm*—Christensen O'Connor Johnson Kindness PLLC

(57) ABSTRACT

A method is disclosed for classifying plant embryos according to their quality using a logistic regression model. First, sets of image or spectral data are acquired from plant embryos of known quality, respectively. Second, each of the acquired sets of image or spectral data is associated with one of multiple class labels according to the corresponding embryo's known quality. Third the sets of image or spectral data values are filtered to provide filtered image or spectral data values. Fourth, a classification algorithm, e.g., a logistic regression analysis is applied to the filtered data values and their corresponding class labels to develop a classification model. Fifth, image or spectral data are acquired from a plant embryo of unknown quality, and filtered data values are derived therefrom. Sixth, the classification model is applied to the filtered data values for the plant embryo of unknown quality to classify the same.

13 Claims, 6 Drawing Sheets

Class 3 Smoothed 2-D Histogram

Class Histograms Superimposed

Class 1 Bayes Probabilities

Class 2 Bayes Probabilities

Class 3 Bayes Probabilities

Class Probabilities Superimposed

METHODS FOR PROCESSING SPECTRAL DATA FOR ENHANCED EMBRYO CLASSIFICATION

CROSS REFERENCE TO RELATED APPLICATION

The present application claims the benefit of U.S. Provisional Application No. 60/639,995, filed Dec. 28, 2004.

FIELD OF THE INVENTION

The invention is directed to classifying plant embryos to identify those embryos that are likely to successfully germinate and grow into normal plants, and more particularly, to a method for classifying plant embryos using filtered image and/or spectral data.

BACKGROUND OF THE INVENTION

Reproduction of selected plant varieties by tissue culture has been a commercial success for many years. The technique has enabled mass production of genetically identical selected ornamental plants, agricultural plants, and forest species. The woody plants in this last group have perhaps posed the greatest challenges. Some success with conifers was achieved in the 1970s using organogenesis techniques wherein a bud, or other organ, was placed on a culture medium where it was ultimately replicated many times. The newly generated buds were placed on a different medium that induced root development. From there, the buds having roots were planted in soil.

While conifer organogenesis was a breakthrough, costs were high due to the large amount of handling needed. There was also some concern about possible genetic modification. It was a decade later before somatic embryogenesis achieved a sufficient success rate so as to become the predominant approach to conifer tissue culture. With somatic embryogenesis, an explant, usually a seed or seed embryo, is placed on an initiation medium where it multiplies into a multitude of genetically identical immature embryos. These can be held in culture for long periods and multiplied to bulk up a particularly desirable clone. Ultimately, the immature embryos are placed on a development medium where they are intended to grow into somatic analogs of mature seed embryos. As used in the present description, a "somatic" embryo is a plant embryo developed by the laboratory culturing of totipotent plant cells or by induced cleavage polyembryogeny, as opposed to a zygotic embryo, which is a plant embryo removed from a seed of the corresponding plant. These embryos are then individually selected and placed on a germination medium for further development. Alternatively, the embryos may be used in artificial seeds, known as manufactured seeds.

There is now a large body of general technical literature and a growing body of patent literature on embryogenesis of plants. Examples of procedures for conifer tissue culture are found in U.S. Pat. Nos. 5,036,007 and 5,236,841 to Gupta et al.; U.S. Pat. No. 5,183,757 to Roberts; U.S. Pat. No. 5,464,769 to Attree et al.; and U.S. Pat. No. 5,563,061 to Gupta. Further, some examples of manufactured seeds can be found in U.S. Pat. No. 5,701,699 to Carlson et al., the disclosure of which is hereby expressly incorporated by reference. Briefly, a typical manufactured seed is formed of a seed coat (or a capsule) fabricated from a variety of materials such as cellulosic materials, filled with a synthetic gametophyte (a germination medium), in which an embryo surrounded by a tube-like restraint is received. After the manufactured seed is planted in the soil, the embryo inside the seed coat develops roots and eventually sheds the restraint along with the seed coat during germination.

One of the more labor intensive and subjective steps in the embryogenesis procedure is the selective harvesting from the development medium of individual embryos suitable for germination (e.g., suitable for incorporation into manufactured seeds). The embryos may be present in a number of stages of maturity and development. Those that are most likely to successfully germinate into normal plants are preferentially selected using a number of visually evaluated screening criteria. A skilled technician evaluates the morphological features of each embryo embedded in the development medium, such as the embryo's size, shape (e.g., axial symmetry), cotyledon development, surface texture, color, and others, and selects those embryos that exhibit desirable morphological characteristics. This is a highly skilled yet tedious job that is time consuming and expensive. Further, it poses a major production bottleneck when the ultimate desired output will be in the millions of plants.

It has been proposed to use some form of instrumental image analysis for embryo selection to supplement or replace the visual evaluation and classification described above. For example, International Patent Application No. PCT/US99/12128 (WO 99/63057), explicitly incorporated by reference herein, discloses a method for classifying somatic embryos based on images of embryos or spectral information obtained from embryos. Generally, the method develops a classification model (or a "classifier") based on the digitized images or NIR (near infrared) spectral data of embryos of known embryo quality (e.g., potential to germinate and grow into normal plants, as validated by actual planting of the embryos and a follow-up study of the same or by the morphological comparison to normal zygotic embryos). A "classifier" is a system that identifies an input by recognizing that the input is a member of one of a number of possible classes. The classifier is then applied to image or spectral data of an embryo of unknown quality to classify the embryo according to its presumed embryo quality.

Various classification models, or classifiers, are available, such as Fisher's linear and quadratic discriminant functions, classification trees, k-nearest-neighbors clustering, neural networks, and SIMCA. All of these models have been successfully used in many applications, but have been found to perform below expectations when classifying embryos because they either fail to be fast enough or the data from the embryos do not meet the requirements for these classifiers to work.

PCT/US99/12128 (WO 99/63057), incorporated above, discloses an embryo classifier using a Lorenz curve and a Bayes optimal classifier, termed "Lorenz-Bayes" classifier. Furthermore, co-assigned U.S. Patent Application Publication No. 2005/0069176 describes a generalized form of Lorenz-Bayes classifier for classifying plant embryos. In addition, co-assigned U.S. Patent Application Publication No. 2006/0068372 describes a method of classifying plant embryos using penalized logic regression.

While these methods have been successful in rapidly and accurately classifying embryos according to their embryo quality, there is a continuing need to further increase the classification speed and accuracy in order to achieve mass classification required for mass production of manufactured seeds.

SUMMARY OF THE INVENTION

The present invention is directed to classification of plant embryos by the application of classification algorithms to digitized images and/or data relating to or based on the absorption, transmittance, reflectance, or excitation spectra of the embryos. While the classification methods of the invention may be applied to image and spectral information acquired from embryos, the invention is not concerned with or limited to any particular method of acquiring image or spectral information. In fact, the methods may be applied to image and spectral information acquired based on a variety of technologies, which are available at the present time and may be developed in the future, including relatively more complex technologies such as multi-viewpoint imaging (e.g., imaging a top view, side view, and end view of an embryo), imaging in color, imaging using non-visible portions of the electromagnetic spectrum, imaging using fluorescent proteins and/or quantum dots markers of specific molecules, and imaging using energy input to embryos to get certain molecules, tissues, or organs to emit particular energies that can be detected. Image or spectral data may be obtained from whole plant embryos or any portion(s) thereof.

According to the present invention, a classification model is developed based on filtered digital image, spectral data, or both of reference samples of plant embryos of known embryo quality. The embryo quality of the reference samples may be determined based on the embryo's conversion potential, resistance to pathogens, drought resistance, and the like, as validated by actual planting of the embryos and a follow-up study of the same, or by morphological comparison of the embryos to normal zygotic embryos. Optionally, raw digital or spectral data may be preprocessed before filtering using one or more preprocessing algorithms to reduce the amount of raw image or spectral data.

According to the present invention, a classification model is developed using the filtered image and/or spectral data of the embryos of known quality. The developed classification model can then be used to classify embryos of unknown quality according to their putative quality.

Specifically, according to one aspect of the present invention, a method is provided to classify plant embryos according to their quality. The method includes generally six steps. First, sets of image and/or spectral data are acquired from plant embryos of known quality. Second, each set of image and/or spectral data obtained from an embryo is associated with one of multiple class labels according to the embryos' known quality. For example, three class labels (e.g., non-germ—embryos that will not germinate, germ small—embryos needing extra care to germinate and germ transplantable—embryos that vigorously germinate with minimal care) may be used, or alternatively, fewer or more class labels may be used. Third, the sets of image and/or spectral data of embryos of known quality are filtered to provide filtered data values of embryos of known quality. Thus, at this point, each set of filtered data values derived from a set of image and/or spectral data obtained from an embryo of known quality is associated with a particular class label indicative of that embryo's known quality. Fourth, a classification algorithm, such as logistic regression (LR) analysis, is applied to sets of filtered data values and their corresponding class labels to develop a classification model. Fifth, image and/or spectral data is acquired from a plant embryo of unknown quality, and a set of filtered image or spectral values is calculated based on the acquired image or spectral data of the embryo of unknown quality. Sixth, the classification model is applied to the filtered data values of the plant embryo of unknown quality to classify the same.

According to another aspect of the present invention, a method is provided to develop a classification model for classifying plant embryos according to their quality. The method includes generally three steps. First, sets of image and/or spectral data of plant embryos of known quality are received, and one of multiple class labels is assigned to each set of image and/or spectral data obtained from an embryo according to the embryo's known quality. Second, sets of filtered image and/or spectral values are derived from the sets of image and/or spectral data of embryos of known quality. Third, a classification algorithm is applied to sets of filtered data values and their corresponding class labels to develop a classification model.

According to another aspect, a method of the present invention is implemented in the form of computer-executable instructions (software) running on a computer. In one embodiment, the instructions, when loaded onto a computer, perform generally two steps: (a) receiving sets of filtered image and/or spectral data of plant embryos of known quality, wherein each set of filtered image and/or spectral data of a plant embryo of known quality is associated with one of multiple class labels according to the known quality of the embryo from which the set of filtered data values are derived; and applying a classification algorithm to the received sets of filtered data values and their corresponding class labels to develop a classification model. In a further embodiment, the instructions further perform the additional steps of: (c) receiving a set of filtered image and/or spectral data values of a plant embryo of unknown quality; and (d) applying the classification model to the filtered image and/or spectral values of the plant embryo of unknown quality to classify the same.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The methods of the present invention may be used to develop models to classify plant embryos and to classify any type of plant embryos, including both zygotic and somatic embryos, according to their embryo quality. Classification models should accurately classify embryos, i.e., reliably classify the embryo as acceptable or unacceptable, and it should also be capable of handling volumes of embryos at rates that are commercially acceptable. a classification model that is 100% accurate, yet only is capable of processing small volumes of embryos at very slow rates would not be commercially desirable. Likewise, a classification model capable of processing large volumes of embryos at high rates, yet not very accurately, would not be commercially desirable. When the percentage of embryos that are passed through two classification models are equal, the classification model which passes the larger number of embryos as acceptable would be more desirable because it ultimately produces a larger number of embryos that will germinate.

Embryo quality may be determined based on any criteria susceptible to characterization or quantification. For example, the embryo quality may be determined based on one or more criteria, such as the embryo's conversion potential (i.e., potential for germination and subsequent plant growth and development), resistance to pathogens, drought resistance, heat and cold resistance, salt tolerance, preference for (or indifference to) light quality, suitability for long term storage, and the like. As more information is known about plant embryos and their desirability, more criteria may be developed to further refine the selection process to identify only truly "high-quality" embryos with various desirable characteristics. In various exemplary embodiments of the present invention, plant embryos are to be classified into two or more quality classes using any one or more of these classification criteria. For example, plant embryos may be classified into three classes: a class of acceptable, relatively high-quality embryos, i.e., germ transplantable or gt, a class of unacceptable, relatively low-quality embryos, i.e., nongerm or ng, and an intermediate class that are acceptable yet require special handling for germination, i.e., germ small or gs. Alternatively, plant embryos may be classified into fewer or more classes and the present invention is not limited to a particular number of classes.

Embryos from all plant species may be classified using the methods of the present invention. The methods, however, have particular application to agricultural plant species where large numbers of somatic embryos are used to propagate desirable genotypes, such as forest tree species. Specifically, the methods can be used to classify somatic embryos from the conifer tree family Pinaceae, particularly from the genera: *Pseudotsuga* and *Pinus*.

Figure 1:
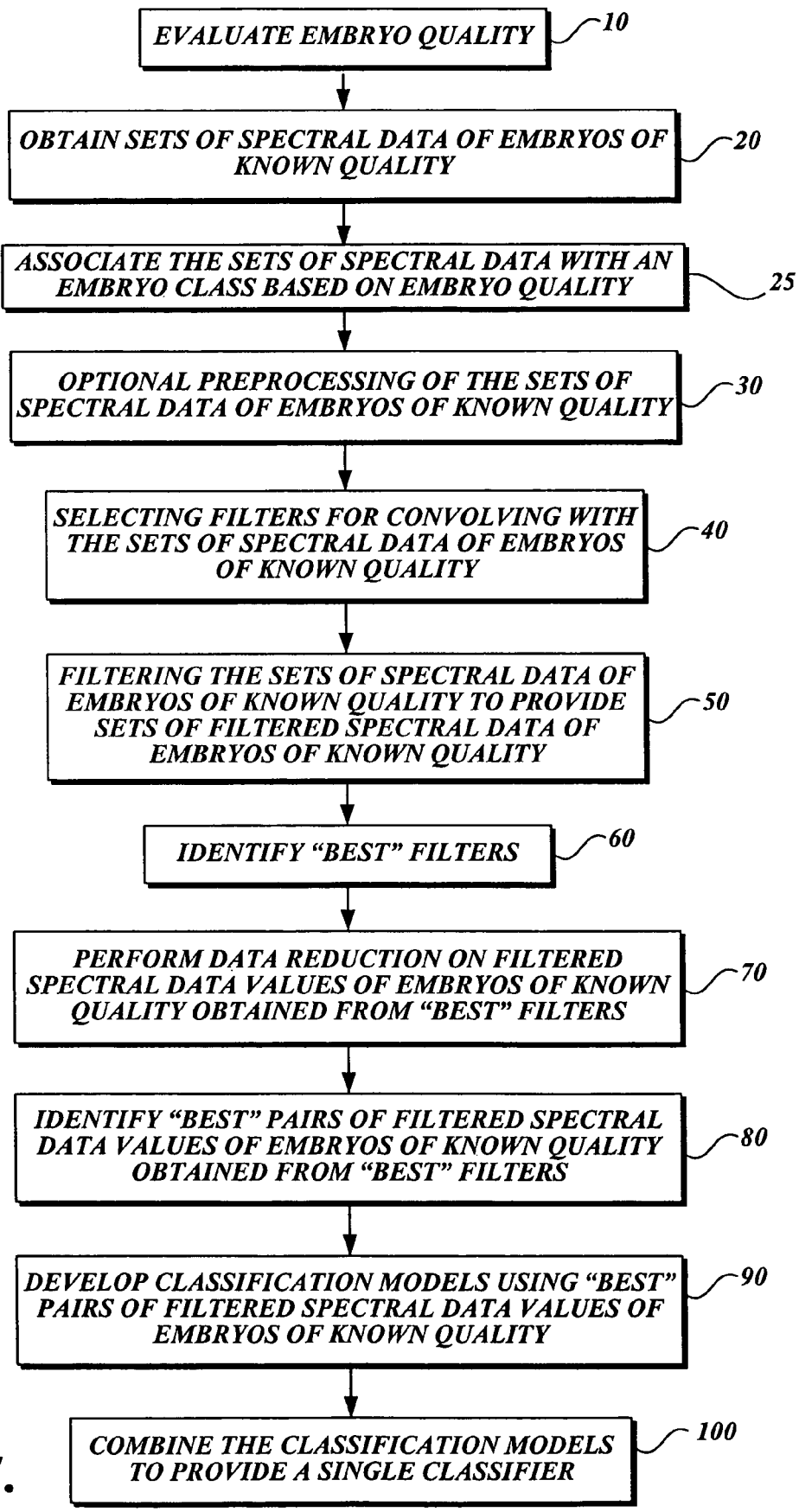
FIG. 1 is a flowchart illustrating an overall method of the present invention for developing a classification model for classifying embryos using filtered image and/or spectral data.

FIG. 1 illustrates general steps involved in a method of the present invention for developing a classification model to classify embryos of unknown quality using image and/or spectral data of the embryo. In block 10, embryo quality is evaluated, as described above in detail. In block 20, sets of image data are obtained from plant embryos (or any portions thereof), respectively, using one or more views (top view, side view, end view, etc.) using any known or to-be-developed technology, such as an electronic camera containing a charge-coupled device (CCD) linked to a digital storage device. Spectrometric image acquisition and analysis of embryos can be performed using a data collection setup that includes, for example, a light source (e.g., a near infrared, NIR, source), a microscope, a light sensor, and a data processor. Using such a setup, embryos or embryo regions are scanned and spectral data are acquired regarding absorption, transmittance, reflectance, or excitation of electromagnetic radiation at one or more discrete wavelengths or wavelength bands. Further, images can be acquired of radiographic or fluorescent protein or quantum-dot chemical markers. Differences in spectral data collected from embryos of high quality versus those of low quality are presumed to reflect differences in chemical composition that are related to embryo quality. Any suitable data acquisition protocols can be used to specify embryo sampling methods, the amount of data required, or repeated measurement required to obtain data of sufficient quality, to make satisfactory classifications of the embryos.

Optionally, the acquired raw digital image or spectral data can be preprocessed at block 30 using suitable preprocessing algorithms. Any such algorithms apparent to one skilled in the art may be used, for example, to remove background information (i.e., any data derived from non-embryo sources such as background light scatter or other noise), or to reduce the size of the digital or spectral data file. For example, U.S. Pat. No. 5,842,150 discloses that NIR spectral data can be preprocessed prior to multivariate analysis using the Kubelka-Munk transformation, the Multiplicative Scatter Correction (MSC), the Fourier transformation, or the Standard Normal Variate transformation, all of which can be used to reduce noise and adjust for drift and diffuse light scatter. As another example, the amount of digital data required to represent an acquired image or spectrum of an embryo can be reduced using interpolation algorithms, such as wavelet decomposition. See for example, Chui, C. K., *An Introduction to Wavelets,* Academic Press, San Diego, 1992; Kaiser, Gerald, *A Friendly Guide to Wavelets,* Birkhauser, Boston; and Strang, G. and T. Nguyen, *Wavelets and Filter Banks,* Wellesley-Cambridge Press, Wellesley, Mass. Wavelet decomposition has been used extensively for reducing the amount of data in an image, and for extracting and describing features from biological data. A variety of other interpolation methods can be used to similarly reduce the amount of data in an image or spectral data file, such as calculation of adjacent averages, Spline methods (see for example, C. de Boor, *A Practical Guide to Splines,* Springer-Verlag, 1978), Kriging methods (see for example, Noel A. C. Cressie, *Statistics for Spatial Data,* John Wiley, 1993), and other interpolation methods which are commonly available in software packages that handle images and matrices.

At block 25, each set of image and/or spectral data obtained from an embryo of known quality in block 20 is associated with one of multiple class labels according to the embryo's known quality. For example, each embryo (and hence the image and/or spectral data obtained therefrom) may be labeled as belonging to one of three classes, as described above.

The discussion below proceeds with reference to data in the form of spectral data; however, it should be understood that the present invention is not limited to the use of spectral data. Other types of data, such as image data, may be used to classify embryos in accordance with the present invention. It has been observed that linear combinations of spectral values over broad bands of wavelengths (e.g., 50 nm to 550 nm) reveal features in the near-infrared spectrum that are found to be very useful for discriminating between embryo germination, potential, and vigor. The use of linear combinations of spectral values is distinct from the practice of looking at differences in spectra at a single wavelength or over a narrow band of wavelengths. In signal processing terminology, these linear combinations are known as filters. These filters are functions that are converted to vectors of real numbers when applied to spectra. The function is often referred to as a kernel, and has mathematical properties suited to the desired filtering task.

Two important filter properties for use in the present invention are the size of the kernel and the number of zero crossings. The size of the kernel determines how much of a spectrum is used to calculate a filtered value. Kernel sizes can range over a few nanometers (nm) to hundreds of nanometers. A useful range of kernel sizes is 51 nm to 551 nm, stepped off in increments of 10 nm.

The number of zero crossings is the number of times the plot of a kernel function crosses zero. In accordance with the present invention, kernels with 1-13 zero crossings have been found to be useful, with kernel functions having 5-12 zero crossings being particularly preferred. In the present invention 5-12 zero crossings are preferred because they produce filtered values or statistics that are the most different for the different classes of germination potential. The number of zero crossings is referred to below as the order of the filter.

A first order kernel is half positive and half negative and calculates a weighted difference from the spectral value centered at a particular wavelength. The result of convolving the kernel with a spectrum is the weighted first derivative of the spectrum at the scale equal to the kernel size. A second order kernel compares spectral values at the two ends of the kernel with those in the middle. Its filtered values are the weighted second derivative of a spectrum. Thus, the filters are in essence calculating weighted derivatives of the spectra at the scale equal to the kernel size.

The absolute value of a kernel will produce a new function that is either symmetric about the kernel center or not. Kernel functions whose absolute value is symmetric have found spectral features with greater discriminating power than those which are asymmetric. How quickly and how smoothly the kernel function tapers to zero at its ends also affects how well the features discriminate between germination potential and vigor. Also, how the kernel tapers, can shift the location of the discriminating features backward or forward in wavelength. The shape of the kernel also affect the location of useful spectral features, how strongly the spectral features discriminate between germination potential and vigor, and how correlated distinct features are with each other.

Many functions can serve as kernel functions, and some examples include derivatives of the Gaussian function, $e^{-x^2/(2s^2)}$, are wavelets and are useful in the present invention. Signum $(Sin(x))*Abs(Sin(x))^p$. With p=2, is also a useful function. Daubechies wavelets are another set of useful kernel functions. Derivatives of various probability density functions also produce useful kernels, some symmetric in their absolute values and some asymmetric. Other functions that capture the variation in germination potential and vigor of plant embryos and the relation of such to the NIR spectra are useful.

Referring to block 40 of FIG. 1, a plurality of filters are identified from combinations of kernel properties, including size, kernel order, and kernel function and are convolved with the NIR spectra of plant embryos of known quality. These are the statistical values used in the present invention. At block 50, convolving the filters with the NIR spectra of the plant embryos of known quality produces filtered spectral data values for the plant embryos of known quality. These are the statistical values specifically used in the present invention. At block 50, the filters that are convolved with the spectra will have varying capabilities to discriminate between the classes of embryos. In accordance with the present invention, it is desirable to identify the filters that best discriminate between the classes of embryos. In order to identify these "best" filters, cumulative distribution functions are estimated at each wavelength for each kernel for each germination class or vigor class. The maximum absolute difference between a pair of cumulative distribution functions is a Smirnov statistic. For a given pair of germination or vigor classes, Smirnov statistics are calculated at each wavelength for each kernel. A maximum Smirnov statistic is used as a measure of how well a particular filter finds parts of the NIR spectra that discriminate between the given pair of embryo classes.

An array of Smirnov statistics, comparing the cumulative distribution functions of a pair of plant embryo classes, indexed by kernel size, kernel order, and any other kernel properties used in the filter can be created. Patterns in this array reveal how kernel size, kernel order, and other kernel properties interact with each other. These patterns and interactions reveal information about how the NIR spectra of the plant embryo classes differ.

The "best" filters are the ones that produce the highest Smirnov statistics in the array. A number of the "best" filters, e.g., 100, are identified and used to generate a pool of candidate filtered spectral data values of embryos of known quality for use in developing the classification model. It is desirable to obtain filtered values from several kernels because different parts of the NIR spectrum may yield information useful for classifying plant embryos and one may only be able to extract the information using a kernel of a specific size, order, or other kernel property.

As an alternative to Smirnov statistics, other statistics can be used to identify the "best" filters. For example, the Gini coefficient, the Cramer-Von Mises statistic, the Kuiper statistic, the Watson statistic, the Anderson-Darling, and the Adjne statistic can be used. Conceptually, the idea of classifying objects from two or more classes is a distribution based exercise. The goal in identifying the best filters is to seek functions of data that have different distributions for the different classes of embryos where the distributions overlap as little as possible. The primary goal is to find kernel functions that will create distributions of filtered values for the plant embryo classes that overlap as little as possible for some part of the NIR spectrum. The filtered values are then used in classification algorithms to develop classification models.

Convolving the plurality of filters with the near-infrared spectra of embryos of known quality produces large volumes of data. Even the filtered spectral values from the 100 "best" filters define large volumes of data. Only certain of the filtered spectral values will contain information that can be used to discriminate between embryo classes. At block 70, a data reduction is carried out in order to reduce the volume of data. The goal of the data reduction step is to reduce the volume of data by keeping filtered spectral data values that are necessary to discriminate between embryo classes and remove filtered values that are redundant. The end result of this data reduction is the identification of a number of "best" filtered spectral values for the embryos of known quality. In most instances, the data reduction step will result in the identification of a sub-set of the filtered spectral values resulting from convolving the "best" filters with the NIR spectra of the embryos of known quality. In certain instances, the number of filtered spectral values may be low enough that no data reduction is necessary, particularly where the filtered spectral values are capable of effectively discriminating between embryo classes.

This application describes a new method for reducing the large multivariate data set comprising the candidate filtered spectral data values of the embryos of known quality. The method is effective at eliminating unnecessary filtered spectral data values. It retains a portion of the original filtered spectral values without transforming the values themselves, as happens in many other data reduction methods, such as principal components. Leaving the filtered spectral values unchanged is desirable because it simplifies implementation of classification algorithms in a manufacturing setting, as only the useful parts of the near-infrared spectrum need to be measured.

The data reduction method at block 80 starts by calculating the Smirnov statistic between pairs of classes at each wavelength for a given kernel. Unlike previous methods, there is no step of thresholding the Smirnov statistic. The Smirnov statistics are sorted from largest in absolute value to smallest. The absolute value of the correlation matrix between the filtered spectral data values at all wavelengths is calculated, and then rows and columns sorted, so as to be in the same order as the corresponding Smirnov statistics. As a result, the upper left corner of the matrix corresponds to the wavelength with the largest Smirnov statistic and the lower right corner of the matrix corresponds to the wavelength with the smallest Smirnov statistic. The correlations are Pearson product correlation coefficients.

Starting with the first row, all columns with a correlation to the right of the main diagonal having a coefficient greater than some threshold, for example, 0.8, are deleted. The corresponding rows are deleted. The indices of the original columns surviving this deletion are kept. The correlation matrix is now smaller by the number of rows and columns deleted. Next, the same process is repeated for the second row of the correlation matrix, further reducing the correlation matrix and listed indices of acceptable columns. The end result is a reduced list of the original filtered spectral data values of embryos of known quality that are no more correlated than the threshold. Using 0.8 as the threshold, typically 90-95% of the filtered spectral data values are removed from consideration. The surviving filtered spectral data values have Smirnov statistics which range from the maximum to zero. Using this data reduction method, little of the useful information for discriminating between embryo germination classes is lost.

In other words this data reduction method splits the data set into two subsets. The first and smallest subset contains all the filtered spectral values with the most discriminating potential and with correlations no larger than the correlation threshold. The second and larger subset contains all the filtered spectral values that are highly correlated, as defined by the correlation threshold, with both the filtered spectral values in the first subset and with each other. Because of the high correlation between the elements of these two subsets the second subset contains redundant information which can be eliminated from further consideration in developing classification models.

The main idea behind this data reduction step is two-fold. First, the data vectors are sorted according to some criteria, and second, data vectors that are highly correlated with data vectors having the same or higher values of the criteria are sequentially removed. This technique works well in data sets composed of moderately to highly correlated elements.

The first subset will contain filtered spectral values that yield Smirnov statistics with values equal to or close to zero. These filtered spectral values may still be very useful in discriminating between classes when combined with other filtered spectral values. The splitting of the original data set into two subsets is based on univariate Smirnov statistics, which measure the degree of overlap between two distributions as viewed from a single dimension. The first subset is usually small enough to search it pair-wise for two-dimensional Smirnov statistics with high absolute values.

This process is repeated for each of the filters selected as the "best" filters with which to filter the spectra of the embryos of known quality. All of these surviving filtered spectral values from all of the "best" filters are combined into one large set and the whole data reduction scheme is repeated on this data set. This data reduction method can reduce the set of candidate filtered spectral data values from several hundred thousand or millions to 1,000-3,000, depending on how low the correlation threshold is set.

The process of finding the best kernels and reducing the filtered data values is done for each pair of germination classes. Accordingly, the information in the spectra useful for discriminating between each pair of germination classes is extracted and used in its own classification algorithm as described below in more detail. This allows the overall classification scheme to be more flexible and sensitive to differences between germination classes.

All of the filtered values that survive these univariate based data reduction steps are passed to the two-dimensional data reduction step, even the ones with a Smirnov statistic of zero. The reason for this is that the cumulative distribution functions of two classes may look the same in a single dimension, but two-dimensional distributions can be quite different when that single filtered value is combined with another filtered value. The end result is the set of the best pairs of filtered spectral data values for separating the distributions of the plant embryo classes. All possible pairs of filtered values are created and the two-dimensional Smirnov statistics are calculated. At block 80, the "best" pairs of filtered values, in terms of highest two-dimensional Smirnov statistics, are kept for building classification models. The number of "best" pairs kept can vary. An exemplary number is 100.

The two-dimensional Smirnov statistics are obtained by calculating two-dimensional smoothed histograms for the plant embryo classes under consideration and subtracting them. The portions of the two-dimensional smoothed histograms that correspond to the positive differences are integrated over the area of positive differences and the absolute difference between the two integral values is calculated (this is a pair wise comparison between the two-dimensional distributions of the pair of classes under consideration). The same thing is done for the area of negative differences. The larger of the two absolute differences between integral values is used as the two-dimensional Smirnov statistic.

At block 90, the "best" filtered values resulting from the data reduction step are used to develop a classification model, as described below in more detail. The "best" filtered spectral data values of embryos of known quality are used as inputs or independent variables in a classification algorithm, such as logistic regression. Through the model finding process, the statistical significance of the inputs to the classification model are determined. Non-significant terms are removed from the models. Since this is done for each of the models created for each pair of classes the classification models will usually be different for the respective pairs. Below, development of a classification model is described using logistic regression as an example of a classification algorithm. It should be understood that other classification algorithms, such as neural networks, Parzen-Bayes classifiers, K-nearest neighbors classifiers, and random forests are also useful. If there are only two classes of plant embryos, there will be one pair of germination classes to be modeled by one or more logistic regression models. If there are three classes of plant embryos, there will be three pairs of classes to model with logistic regression models. More classes of embryos will require more models.

The general form of a polytomous multivariate logistic regression model is given by $$P(\text{Class} = j \mid x_1, x_2, \ldots, x_q) = \frac{e^{g_j(x_1, x_2, \ldots, x_q)}}{\sum_{j=0}^{n-1} e^{g_j(x_1, x_2, \ldots, x_q)}}.$$

This equation is read, the probability that the class is j given the q input variables, x, is equal to the function to the right of the equal sign. The sum of all the class probabilities for a given set of input variables is 1. Therefore, in the case of n classes there are n-1 independent models because the nth model is obtained by subtracting the sum of the n-1 models from 1. For the case of three classes, these are the three models, any two of which can be used to get the third.

$$P(\text{Class} = 0 \mid x_1, x_2, \ldots, x_q) = \frac{1}{1 + e^{g_1(x_1, x_2, \ldots, x_q)} + e^{g_2(x_1, x_2, \ldots, x_q)}}$$

$$P(\text{Class} = 1 \mid x_1, x_2, \ldots, x_q) = \frac{e^{g_1(x_1, x_2, \ldots, x_q)}}{1 + e^{g_1(x_1, x_2, \ldots, x_q)} + e^{g_2(x_1, x_2, \ldots, x_q)}}$$

$$P(\text{Class} = 2 \mid x_1, x_2, \ldots, x_q) = \frac{e^{g_2(x_1, x_2, \ldots, x_q)}}{1 + e^{g_1(x_1, x_2, \ldots, x_q)} + e^{g_2(x_1, x_2, \ldots, x_q)}}$$

These functions are used to calculate predicted class membership probabilities. The principal components are calculated from the holdout cross-validation class membership probabilities. The holdout cross-validation class membership probabilities are obtained from the above models by inputting the values of the input variables from the embryos in the cross-validation holdout set.

The functions, $g_j$, can be any functions and are usually different from each other. Often they are multivariate regression functions. As a specific example, multivariate $4^{th}$ order polynomial functions can be used and have the following form.

$$g_j(x_1, x_2, \ldots, x_p) = \alpha_{j,0} + \sum_{k=1}^{p} \alpha_{j,k} x_k + \sum_{k=1}^{p} \beta_{j,k} x_k^2 + \sum_{k=1}^{p} \gamma_{j,k} x_k^3 + \sum_{k=1}^{p} \lambda_{j,k} x_k^4$$

Some of the coefficients ($\alpha$'s, $\beta$'s, $\gamma$'s, $\lambda$'s) can be 0, and the coefficients are not the same for the two models. The coefficients are estimated from the data using maximum likelihood estimation techniques. Repeating the estimation step is necessary when input variables with coefficients statistically equal to zero are dropped from the functions.

The usual method for determining statistical significance of the inputs in a logistic regression model is to fit the full model and then a reduced model without one of the regressors. A likelihood ratio statistic is then used to determine statistical significance of the excluded regressor.

When sample sizes are small for some of the classes or the regressors are correlated, the information matrix used in fitting the logistic regression models can be ill-conditioned. This makes both the fitting of the model and the likelihood ratio statistics unstable or incalculable. A work around for the fitting problem is to use the Moore-Penrose generalized inverse of the information matrix. This approach is useful when one desires to maintain the consistency of using the same model fitting approach with the same initial model across data sets. An alternate approach for determining a statistical significance of the regressors is to fit the models to random subsamples of the data, build the distributions of the model parameters, and use the distributions to determine the statistical significance of the regressors. This regressor subset selection process can be automated by repeatedly building the coefficient distributions and keeping only those regressors whose distribution does not include zero or only a small fraction of the distribution extends past zero. The fractions or significance levels for a two-sided significance test should be large at first and gradually decreased as regressors are dropped from the model. An exemplary set of such significance levels may be 0.4, 0.3, 0.2, 0.1, 0.05, where the 0.05 level is repeated until no regressors are removed from the models. This method is biased, as are all regressor subset selection algorithms, except for testing all possible subsets, which is computationally impracticable for large numbers of regressors.

In accordance with the present invention, model finding can be carried out by first normalizing the "best" twenty pairs of filtered spectral data values of embryos of known quality by subtracting their median and then dividing by their interquartile range. Normalizing the filtered spectral data values in the model finding step is preferred to not normalizing the filtered data values as it has been observed to produce more accurate models. The normalized values are raised to the powers of 1, 2, 3, and 4; and formed into matrices of regressors of the logistic regression models. Cross-product terms may be included. The above-mentioned subset selection method based on empirical distributions from 200 random samples can be used to reduce the number of regressors from 160 to 30-70. The random samples used in each iteration are created by randomly selecting 85% of the embryos in each germination classes. 85% is not critical. Other fractions, for example, 90% or 80% can also be chosen and used.

At block 100, once the statistically significant regressors for all of the models are identified, the models can be used to create the next stage of the classification method. For the input regressor values from a single embryo, the logistic regression models output probabilities of class membership. If there is more than one model, then multiple class membership probabilities will be created for each class. For example, if there are three models each of the three models will predict three class membership probabilities. These multiple class membership probabilities are preferably combined in some fashion into a single classification so that the embryo under consideration can be assigned a class. The multiple predicted class membership probabilities can be combined in many ways. For example, they can be averaged or they can be used in a voting scheme to make a decision. Averaging can be very useful when multiple logistic regression models have been created for each class pair comparison, as averaging can reduce the variability of the predicted class membership probabilities. Alternatively, the predicted class membership probabilities can be transformed by a data reduction routine like principal components or independent components and the results used in a Parzen-Bayes classifier or neural network.

In order to have the predicted class membership probabilities behave like new predicted class membership probabilities from future plant embryos, cross-validation is used to generate a set of predicted class membership probabilities that are based on inputs from embryos whose data was not used in the normalization of the data or the estimating of the logistic regression model parameters. The first two principal components are used to summarize the predicted class membership probabilities from the cross-validation test samples. To test the final quality of the classifier, a randomly chosen test data set is held aside and normalized, run through the logistic regression models, and then transformed into principal components using the normalization, logistic regression model parameters and principal component transform estimated from the training data.

As an example of the above, filtered spectral data values from embryos of known quality from 15% of the embryos in each germination class is randomly selected as a test set and the remaining 85% used as a training set. The training data set will be repeatedly split to produce a small set of data to be excluded from the normalization and logistic regression model parameter estimation. This small set of data is passed through the normalization logistic models to get predicted class membership probabilities from which principal components are eventually calculated. This small set of data is used as a cross-validation data set. The cross-validation data set is derived from the training data set by withholding a percent in each cross-validation iteration, of the embryos in each germination class in the training data set. The principal components are calculated based on all of the predicted class membership probabilities from all of the cross-validation holdout data sets. The signs of the principal components are adjusted, if needed, so that the medians of the components for one of the classes are fixed, for example, negative for the first component and positive for the second component.

The test data are normalized, passed through the logistic regression models using the normalization and logistic regression models estimated using all of the training spectral data. The predicted class membership probabilities for the test spectral data set are transformed using the principal component transformation estimated from all of the cross-validation samples.

Smoothed, two-dimensional histograms are estimated from the training data set principal components, and a weighted Parzen-Bayes classification rule can be created. The weighted Parzen-Bayes classification rule can be obtained by multiplying each histogram by its respective weight and then finding the regions where the histogram of the corresponding class is largest. Test or future embryo data falling into that region in two-dimensional principal component space is then assigned to the class associated with the region. Other methods for determining the classification regions in two-dimensional principal component space can be used. In addition, more principal components can be used, creating higher dimensional principal components spaces into which embryo data can be mapped.

The histograms in the Parzen-Bayes classification rule may be weighted in order to introduce costs into the classification. In addition, the purity of the resulting classification can be set in order to satisfy manufacturing and economic constraints. The purity is the fraction of all embryos passed by the classifier that are acceptable or "good".

In order to produce a final production classifier after the above steps are used to find and test a classifier, the model coefficients can be estimated using all of the spectral data of embryos of known quality, and the principal component transform estimated during the training steps above can be used or a new one can be estimated using cross-validation on all of the data. Using all of the data yields estimators based on more information. Technically, this is not the set of models and principal component transform that was tested with test samples. However, the methodology above produces models and a principal component transform whose output based on training data is distributionally very similar to the output based on data independent of the training data. Therefore using the same method on all of the data should produce models and a principal component transform whose outputs will be similar distributionally to the outputs from future data.

While the above description has been provided based upon NIR spectra, data from other sources can be included along with the filtered NIR spectral values or without the filtered NIR spectral values. These other sources of data can include statistics calculated from images, filtered or unfiltered spectra from other parts of the electromagnetic spectrum, physical or chemical measurements made on the embryos, and the like. If these other data are used by themselves, they can be passed through the data reduction step. Otherwise, they may be combined with the filtered NIR spectra and passed through the data reduction step. If they survive the data reduction step, they can be incorporated into the classification models using whatever functions of them that produce the best results.

The kernels functions described above are useful for detecting regions of the NIR spectra where the shape of the spectra differs for classes of embryos distinguished by germination potential/vigor. In other words, the information in the spectra relating to germination potential/vigor is captured in how the spectra are shaped in certain regions of the NIR spectrum centered at specific wavelengths. Sometimes these differences in shape are very subtle. So long as statistics which capture these differences can be calculated, the embryos can be classified based on germination potential/vigor. The kernel functions mentioned above are not the only set of functions that can extract this shape information. From a mathematical point of view there are an infinite number of functions available for consideration. Any function that can detect the variation due to shape in the spectra over some bandwidth may be useful at discriminating between embryo classes defined by germination potential/vigor. For example functions based on the distributional characteristics within a bandwidth like moments, quantities, or the form of the density function of the spectral values themselves or functions thereof may be useful. Functions based on the correlation structure or bi-spectra of the spectral values at different wavelengths may also be useful. Various transforms of the spectra in whole or in part may prove useful. The same is true of images. Statistics can be calculated from all or part of an image that will discriminate between germination classes. So while the term filtered values is used to describe a specific method for extracting the information in the spectra relating to germination/vigor potential, it is understood that other functions of the spectra capable of numeric or statistical representation may work just as well at extracting how the spectra differ in shape for the different embryo germination classes.

Figure 2:
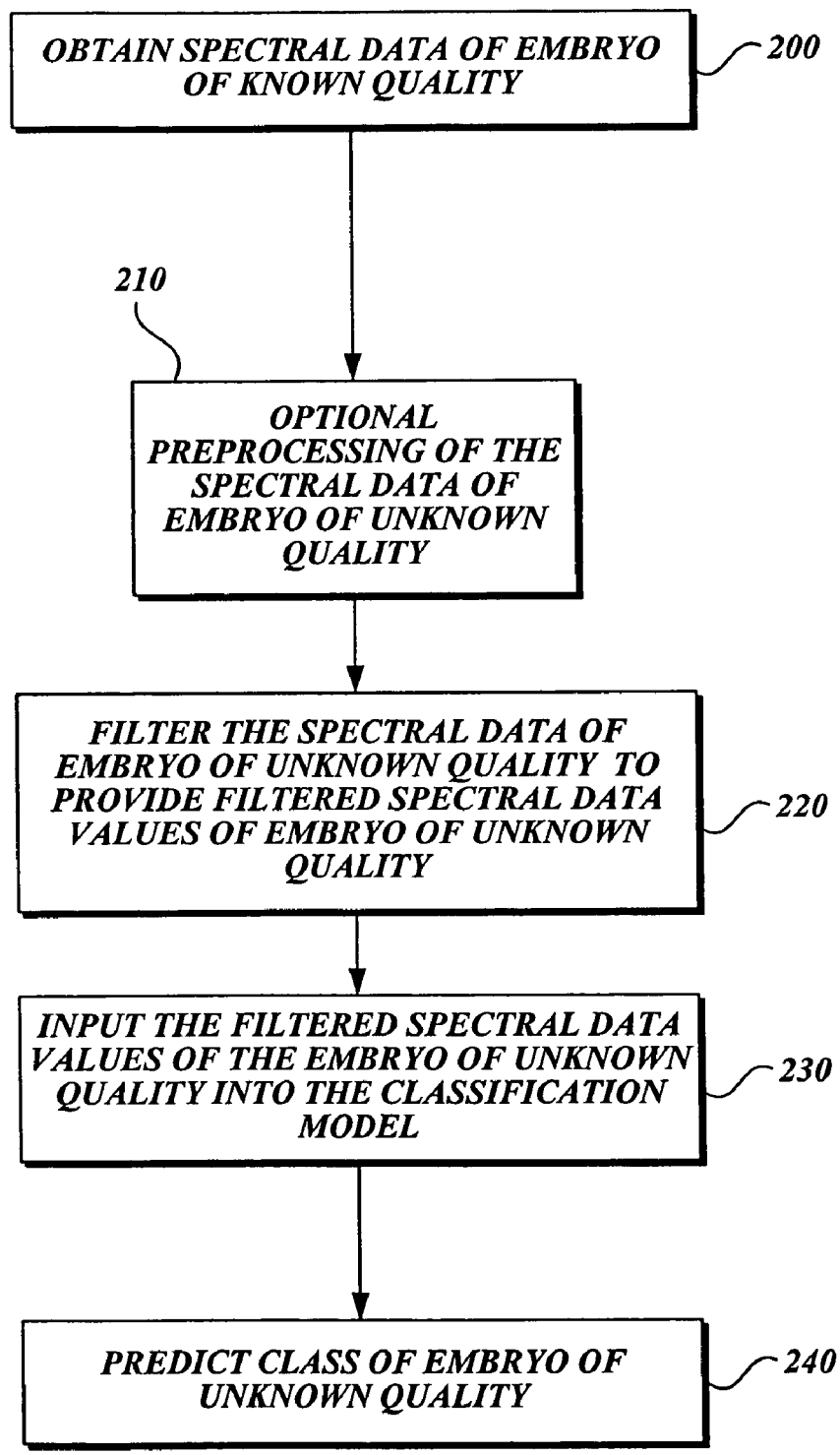
FIG. 2 is a flowchart illustrating use of a classification model developed in accordance with the present invention to classify an embryo of unknown quality.

Referring to FIG. 2, once the classification model is developed, the classification model can be applied to images and/or spectral data obtained from embryos of unknown quality to classify the same. Specifically, a predicted probability of germination for each embryo can be obtained by applying the classification model to the image and/or spectral data obtained from the embryo of unknown quality, or more specifically, to the filtered image and/or spectral data values of the embryo of unknown quality. In various exemplary embodiments of the present method, embryos with a certain minimum probability of germination would then be retained as acceptable.

More specifically, in FIG. 2 at block 200 spectral data of an embryo of unknown quality is collected. The collected spectral data may optionally be pre-processed at block 210. After the optional pre-processing or without the optional pre-processing, at block 220 the spectral data of an embryo of unknown quality is subjected to the filters used to create the classification model. The resulting filtered spectral data values of an embryo of unknown quality are input into the classification model to produce predicted class membership probabilities at block 230. These predicted class membership probabilities for the embryo of unknown quality are then subjected to the principal component transform and compared to the Parzen-Bayes classification rule in order to assign a class to the embryo of unknown quality at block 240.

EXAMPLE

Three genotypes of somatic embryos were used to develop and test a classification model developed in accordance with the present invention. NIR reflectance spectra were obtained from somatic embryos of known quality (thus associated with certain class labels). The spectra were preprocessed, filtered, then used to estimate logistic regression models, a principal component transform and a Parzen-Bayes classifier. Test set of data were then used to assess the goodness of the classification method. A more specific description is provided below.

Three classes of germination potential or vigor: non-germ (ng), germ small (gs), and germ transplantable (gt), were assigned to the embryos from the three genotypes. One logistic regression model is fit for comparing each embryo class against the others, i.e., non-germ versus germ small, non-germ versus germ transplantable, and germ small versus germ transplantable.

The collected spectral data from embryos of known quality are preprocessed by using simple linear regression to regress each spectrum on reference spectrum and then subtracting the regression intercept from the sample spectrum and then dividing the result by the regression slope. When there is no prior spectra available, the reference spectrum can be the median of the sample spectra. The preprocessing eliminates variation due to gathering the spectral data. Gaussian kernels were identified for evaluation in the model forming. The spectral data of embryos of known quality was convolved with the kernels to provide filtered spectral data values of embryos of known quality. The 100 best kernels for each germination class pair combination were identified using cumulative distribution functions and Smirnov statistics as described above. Kernel sizes of 51, 61, ..., 551 nanometers and kernel orders 1, 2, ..., 13 were combined to search for the best kernels. The standard deviation of the Gaussian kernels was kernel size divided by 9. From the filtered spectral data values produced by convolving the 100 best Gaussian kernels with the spectral data of embryos of known quality, the 100 best pairs of filtered NIR spectral data values were identified using the Smirnov statistic data reduction technique described above for each logistic regression model. The correlation threshold was chosen to be 0.8. The resulting 20 best pairs of filtered NIR spectral values of embryos of known quality were used to perform the model finding steps using 200 iterations to estimate each set of coefficients estimated from random samples of the best 20 pairs of filtered NIR spectral data values. The samples used filtered spectral data values from 85% of the embryos from each embryo class. The 20 best pairs of filtered spectral data values were normalized by subtracting the median of the training filtered values and dividing by the inter-quartile range of the training filtered spectral data values. Fourth order polynomial regressors were created for each filtered spectral value yielding 160 degrees-of-freedom in the initial fit of each model. In order to keep all models on the same footing for comparison and ease of implementation, the slower empirical distribution method for model subset selection was used. The normalization and model fit were calculated using the training data set while excluding the cross-validation data set.

The three models developed are set forth below. The 3 sets of models result from fitting 3 three-class logistic regression models to filtered spectral values which have been normalized. These models are an example of fitting one three-class logistic regression model to filtered spectral values which are selected for their ability to discriminate between each pair of classes: 3 sets of filtered spectral values were found and a separate logistic regression model was fit to some of the values. More models per each of classes could have been fit.

The coefficients used in the models below are from the final run of the model finding step applied to the normalized filtered spectral values from Genotype B. The cross-validation step uses these models, but re-estimates the coefficients for each training subset of the training data. The values of the coefficients in the cross-validation step will be similar to those given below but vary according to which data values are used to estimate them. The normalized filtered spectral values from the cross-validation holdout set and the test data set are then used as the input x-values to get predicted class membership probabilities. The principal components transform was estimated from all the cross-validation holdout sets of class membership probabilities.

As described above all the embryo data for a given genotype is randomly divided into a training set and test set. The training set is further divided into cross-validation training sets and holdout sets. For each cross-validation training set the median and inter-quartile range of each filtered values is estimated and the model coefficients are estimated. The overall medians and inter-quartile ranges mentioned below were estimated from the cross-validation training sets.

In the models below the x's, y's and z's with subscripts denote the various normalized filtered spectral values. A three-class logistic regression model is composed of two subfunctions. These are denoted $g_1$ and $g_2$. The same normalized filtered spectral values are used as inputs to these two subfunctions for a given pair of classes. The normalized filtered spectral values are different for the three logistic regression models fit for each pair of classes. To emphasize this, x's are used to denote the normalized filtered spectral values for the nongerm versus germ-small model, y's are used to denote the normalized filtered spectral values for the nongerm versus germ-transplantable model, and z's are used to denote the normalized filtered spectral values for the germ-small versus germ-transplantable model.

Nongerm Versus Germ-Small Model

The best 100 pairs of filtered spectral values for discriminating between nongerm embryos and germ-small for Genotype B embryos were found. The first 20 of these pairs were normalized by subtracting the overall median and dividing by the overall inter-quartile range. The resulting 40 normalized filtered values were then used to create $4^{th}$ order polynomials for fitting a logistic regression model. After all of the nonsignificant terms are removed from the model, the probabilities of an embryo belonging to each of the germination classes are $$P_{Nongerm\,vs.\,germ-small}(\text{Class} = \text{Nongerm} \mid x_1, x_2, \ldots, x_q) = \frac{1}{1 + e^{g_1} + e^{g_2}}$$

$$P_{Nongerm\,vs.\,germ-small}(\text{Class} = GermSmall \mid x_1, x_2, \ldots, x_q) = \frac{e^{g_1}}{1 + e^{g_1} + e^{g_2}}$$

$$P_{Nongerm\,vs.\,germ-small}(\text{Class} = GermTransplantable \mid x_1, x_2, \ldots, x_q) = \frac{e^{g_2}}{1 + e^{g_1} + e^{g_2}}$$

where $g_1 = -0.3667 - 1.0772x_1 - 1.5931x_4 - 2.0936x_8 + 1.1388x_{10} + 3.3947x_{11} +$ $4.3899x_{13} + 2.3137x_{15} - 1.2063x_{19} + 1.2751x_{23} + 0.7432x_{28} -$ -continued
$$0.9249x_{29} + 1.1062x_{32} + 3.0080x_{34} - 0.3079x_{38} - 0.8267x_{39} -$$
$$0.3685x_7^2 + 1.8370x_{18}^2 - 0.6241x_{33}^2 + 0.3078x_{39}^2 + 0.2471x_1^3 -$$
$$0.0920x_{11}^3 - 0.0798x_{23}^3 + 0.1117x_{29}^3 - 0.1822x_{34}^3 + 0.1385x_{37}^3 -$$
$$0.7547x_{18}^4 - 0.3889x_{19}^4 + 0.0952x_{29}^4 - 0.0773x_{31}^4 - 0.0639x_{37}^4$$

and $$g_2 = -1.8438 + 0.9114x_1 - 1.9086x_5 - 3.5738x_7 - 0.5021x_{15} + 0.6209x_{17} +$$
$$1.5142x_{19} - 0.9434x_{22} + 0.8429x_{24} - 1.3750x_{28} - 0.8174x_{31} +$$
$$1.2748x_{39} - 1.2264x_5^2 + 0.5400x_{11}^2 + 0.1970x_{18}^2 - 3.3287x_{19}^2 -$$
$$0.9811x_{34}^2 - 0.8943x_{37}^2 - 0.1523x_8^3 - 1.1109x_{19}^3 + 0.1343x_4^4 - 0.6026x_6^4 -$$
$$0.6050x_7^4 - 0.0492x_8^4 + 0.8244x_{19}^4 - 0.1241x_{24}^4 - 0.2236x_{25}^4 + 0.1749x_{37}^4$$

Nongerm Versus Germ-Transplantable Model

The best 100 pairs of filtered spectral values for discriminating between nongerm and germ-transplantable embryos for Genotype B embryos were found. These are not the same best 100 pairs as those found for discriminating between nongerm and germ-small embryos. The first 20 of these pairs were normalized by subtracting the overall median and dividing by the overall inter-quartile range. The resulting 40 normalized filtered values were then used to create $4^{th}$ order polynomials for fitting a logistic regression model. After all of the nonsignificant terms are removed from the model, the probabilities of an embryo belonging to each of the germination classes are $$P_{Nongerm\,vs.\,germ-transplantable}(\text{Class} = \text{Nongerm} \mid y_1, y_2, \ldots, y_q) = \frac{1}{1 + e^{g_1} + e^{g_2}}$$

$$P_{Nongerm\,vs.\,germ-transplantable}(\text{Class} = GermSmall \mid y_1, y_2, \ldots, y_q) = \frac{e^{g_1}}{1 + e^{g_1} + e^{g_2}}$$

$$P_{Nongerm\,vs.\,germ-transplantable}(\text{Class} = GermTransplantable \mid y_1, y_2, \ldots, y_q) = \frac{e^{g_2}}{1 + e^{g_1} + e^{g_2}}$$

where $$g_1 = 0.1979 - 0.4635y_6 - 0.6180y_8 - 0.3484y_{12} - 1.0113y_{13} + 0.7429y_{16} +$$
$$1.9449y_{17} - 2.5666y_{23} - 1.3582y_{25} - 0.3466y_{26} + 0.4284y_{27} -$$
$$2.6598y_{36} - 0.3995y_{38} + 1.1351y_{10}^2 + 1.4595y_{13}^2 - 0.3281y_{17}^2 -$$
$$0.4228y_{19}^2 + 1.7541y_{24}^2 + 0.9098y_{33}^2 - 0.5584y_{34}^2 - 1.8850y_{37}^2 -$$
$$0.3855y_9^3 - 0.3485y_{13}^3 - 0.2658y_{17}^3 + 0.1515y_{24}^3 + 0.3735y_{25}^3 -$$
$$0.0904y_{27}^3 - 0.1613y_{34}^3 + 0.2814y_{36}^3 + 0.3018y_2^4 - 0.2817y_6^4 -$$
$$0.1095y_7^4 - 0.4208y_{10}^4 - 0.3165y_{13}^4 - 0.1480y_{14}^4 - 0.1200y_{22}^4 -$$
$$0.4281y_{24}^4 - 0.0529y_{26}^4 - 0.7431y_{33}^4 + 0.7353y_{37}^4 + 0.0896y_{38}^4$$

and $$g_2 = -1.1353 + 6.1953y_1 - 0.6765y_2 - 3.1367y_4 +$$
$$2.2394y_5 - 0.9024y_6 + 2.7317y_7 - 2.9426y_9 + 2.6467y_{12} +$$
$$3.6265y_{16} - 2.8026y_{17} + 0.7899y_{20} + 3.1141y_{22} - 3.1495y_{24} -$$
$$2.6858y_{25} - 2.0090y_{33} + 2.5238y_{37} - 2.4337y_{39} - 3.3285y_2^2 +$$
$$1.0035y_{12}^2 + 3.5204y_{14}^2 - 1.5959y_{20}^2 + 1.8037y_{21}^2 + 0.7932y_{28}^2 +$$

-continued
$$0.3854y_{37}^2 - 1.6766y_{39}^2 + 0.1655y_2^3 + 0.2621y_6^3 - 0.3016y_7^3 -$$
$$0.2384y_{19}^3 - 0.5235y_{20}^3 + 0.0592y_{25}^3 + 0.3138y_{30}^3 - 0.4612y_{31}^3 -$$
$$0.0466y_{32}^3 + 1.6438y_{35}^3 + 0.3575y_{36}^3 + 0.2994y_{39}^3 - 0.2853y_3^4 -$$
$$0.5064y_9^4 + 0.1961y_{13}^4 - 2.0869y_{14}^4 - 0.9207y_{17}^4 + 1.0017y_{18}^4 +$$
$$0.0912y_{22}^4 - 0.2159y_{32}^4 - 0.2941y_{34}^4 - 1.2734y_{35}^4 - 0.2108y_{38}^4$$

Germ-Small Versus Germ-Transplantable Model

The best 100 pairs of filtered spectral values for discriminating between germ-small and germ-transplantable embryos for Genotype B embryos were found. These are not the same best 100 pairs as those found for discriminating between nongerm and germ-small embryos. The first 20 of these pairs were normalized by subtracting the overall median and dividing by the overall inter-quartile range. The resulting 40 normalized filtered values were then used to create $4^{th}$ order polynomials for fitting a logistic regression model. After all of the nonsignificant terms are removed from the model, the probabilities of an embryo belonging to each of the germination classes are $$P_{Germ-small\,vs.\,germ-transplantable}(\text{Class} = \text{Nongerm} \mid z_1, z_2, \ldots, z_q) = \frac{1}{1 + e^{g_1} + e^{g_2}}$$

$$P_{Germ-small\,vs.\,germ-transplantable}(\text{Class} = GermSmall \mid z_1, z_2, \ldots, z_q) = \frac{e^{g_1}}{1 + e^{g_1} + e^{g_2}}$$

$$P_{Germ-small\,vs.\,germ-transplantable}(\text{Class} = GermTransplantable \mid z_1, z_2, \ldots, z_q) = \frac{e^{g_2}}{1 + e^{g_1} + e^{g_2}}$$

where $$g_1 = -0.5334 + 0.6249z_1 + 1.3555z_{10} + 1.6388z_{13} - 0.5206z_{17} +$$
$$0.3186z_{31} + 0.4037z_{35} - 0.4701z_{38} + 0.5128z_{39} + 0.4471z_{10}^2 -$$
$$0.4993z_{11}^2 - 0.9146z_{15}^2 + 0.4171z_{17}^2 - 0.2944z_{18}^2 - 0.8195z_{20}^2 -$$
$$0.2853z_{23}^2 + 0.1387z_{32}^2 - 0.6197z_{33}^2 - 0.2868z_3^3 - 0.1354z_{10}^3 -$$
$$0.1667z_{13}^3 + 0.0671z_{15}^3 + 0.0569z_{17}^3 - 0.1437z_{23}^3 + 0.0630z_{33}^3 +$$
$$0.0602z_{36}^3 + 0.1514z_3^4 - 0.1053z_{10}^4 - 0.1218z_{13}^4 - 0.1467z_{14}^4 +$$
$$0.1483z_{15}^4 - 0.0487z_{17}^4 + 0.3119z_{20}^4 + 0.1667z_{33}^4 - 0.0805z_{38}^4$$

and $$g_2 = -2.7414 - 1.5641z_1 - 1.7780z_2 - 9.2905z_3 + 1.2302z_8 -$$
$$1.1653z_{10} - 2.1059z_{12} - 0.5755z_{15} - 2.5726z_{16} + 2.0148z_{17} +$$
$$4.3335z_{18} - 1.3790z_{22} - 1.9345z_{23} - 2.2799z_{24} - 2.1409z_{29} -$$
$$2.2117z_{31} + 1.1681z_{35} + 3.7106z_{37} + 0.4224z_{39} + 0.5282z_{40} -$$
$$0.7933z_6^2 + 2.0772z_{15}^2 + 1.5633z_{24}^2 + 0.6548z_{29}^2 + 1.1996z_{30}^2 -$$
$$1.6904z_{33}^2 - 0.8193z_{38}^2 + 0.2478z_1^3 + 0.2857z_2^3 + 0.2874z_4^3 -$$
$$0.3497z_6^3 + 0.2511z_{10}^3 + 0.1161z_{11}^3 + 0.3643z_{12}^3 + 0.1945z_{13}^3 -$$
$$0.2019z_{17}^3 + 0.0721z_{23}^3 - 0.0425z_{24}^3 - 0.1589z_{27}^3 + 0.0680z_{28}^3 +$$
$$0.1091z_{31}^3 - 0.2864z_{33}^3 + 0.1520z_{37}^3 + 0.1274z_2^4 + 0.2050z_4^4 +$$
$$0.2427z_7^4 - 0.5264z_{15}^4 - 0.3227z_{19}^4 - 0.3326z_{30}^4 - 0.7955z_{35}^4$$

Not all of the initial 40 normalized filtered spectral values end up in the final model in each case. This is a result of the model finding step where polynomial terms found statistically nonsignificant are removed from the model. Removing the statistically nonsignificant polynomial terms further reduces the number of filtered spectral values used to classify embryos.

The resulting models were then used to predict class membership probabilities of the cross-validation holdout samples and the principal components thereof calculated. To test the models, the filtered NIR spectral data values from 15% of the embryos of known quality in each germination class were randomly selected and held out as test data samples. The remaining 85% of the embryo spectral data was used to train the classification model. Three 3-class logistic regression models were fit to the best 20 pairs of filtered spectral values for each comparison between pairs of classes. The filtered spectral values were normalized prior to model fitting by subtracting the median of the training data and dividing by the inter-quartile range of the same. The models were used to create predicted class membership probabilities for the embryos using the cross-validation method described above. The predicted class membership probabilities for the test data set were based on the normalization and logistic regression models calculated based on the training data set.

The principal components of the predicted class membership probabilities were calculated from the cross-validation data set predicted class membership probabilities. This principal component transform was then applied to the test data set predicted class membership probabilities which is like applying it to future embryo near-infrared spectral data.

Figure 3A:
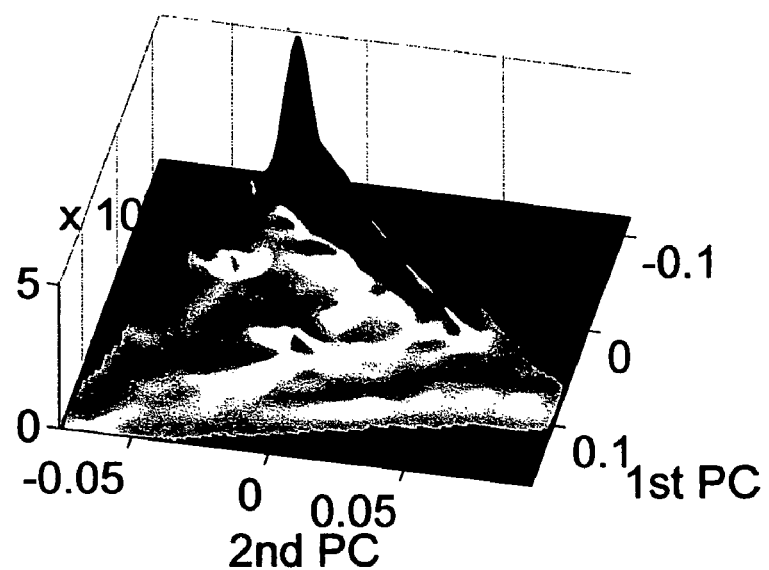
FIGS. 3A-3C are smoothed histograms for three embryo classes formed using the methods of the present invention.
Figure 3B:
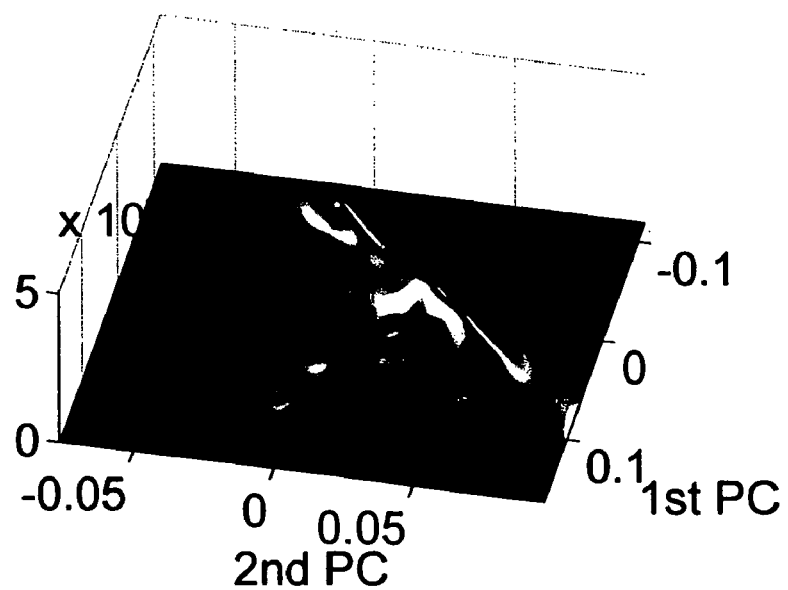
Figure 3C:
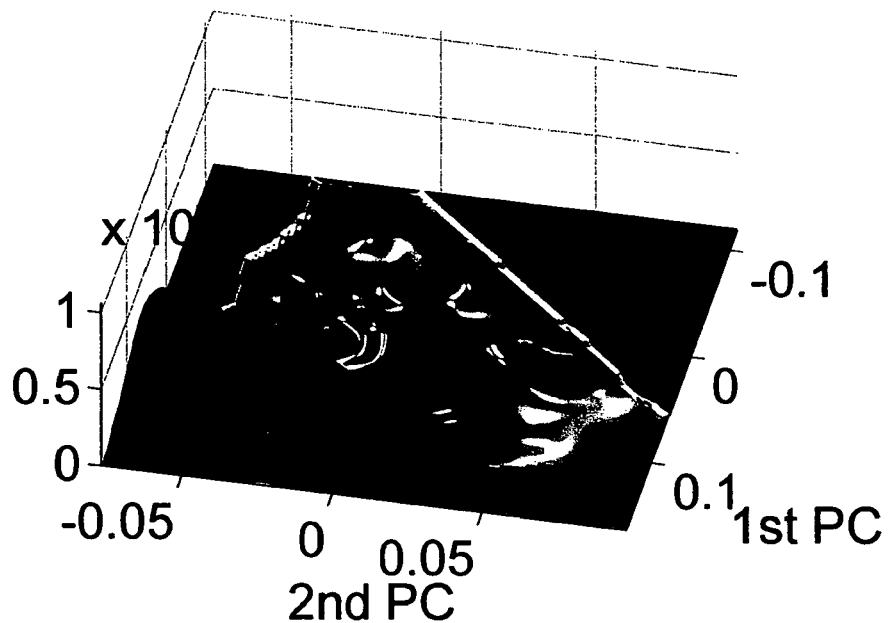
Figure 4:
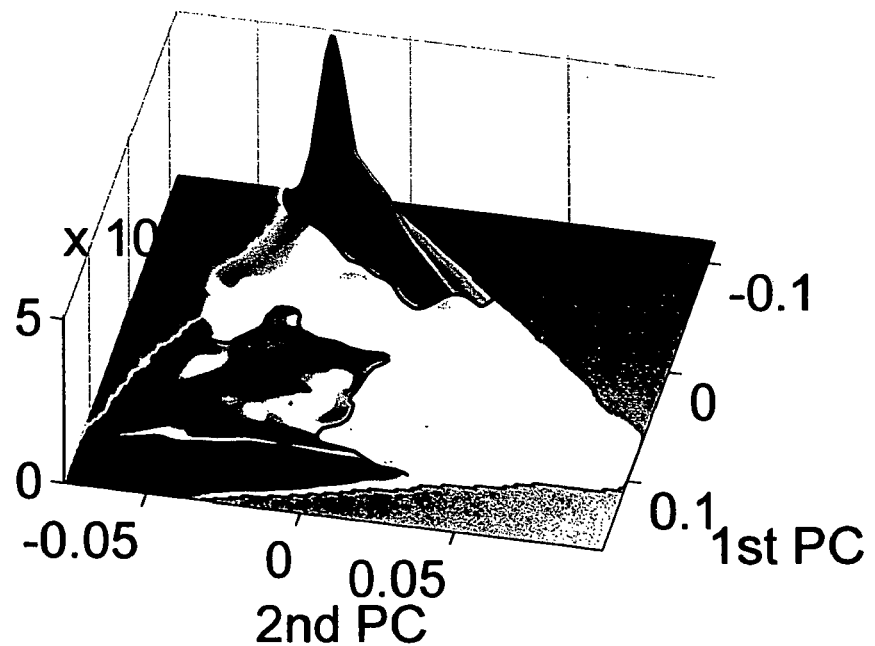
FIG. 4 is a smoothed histogram representing the smoothed histograms of FIGS. 3A-3C superimposed on each other.
Figure 5A:
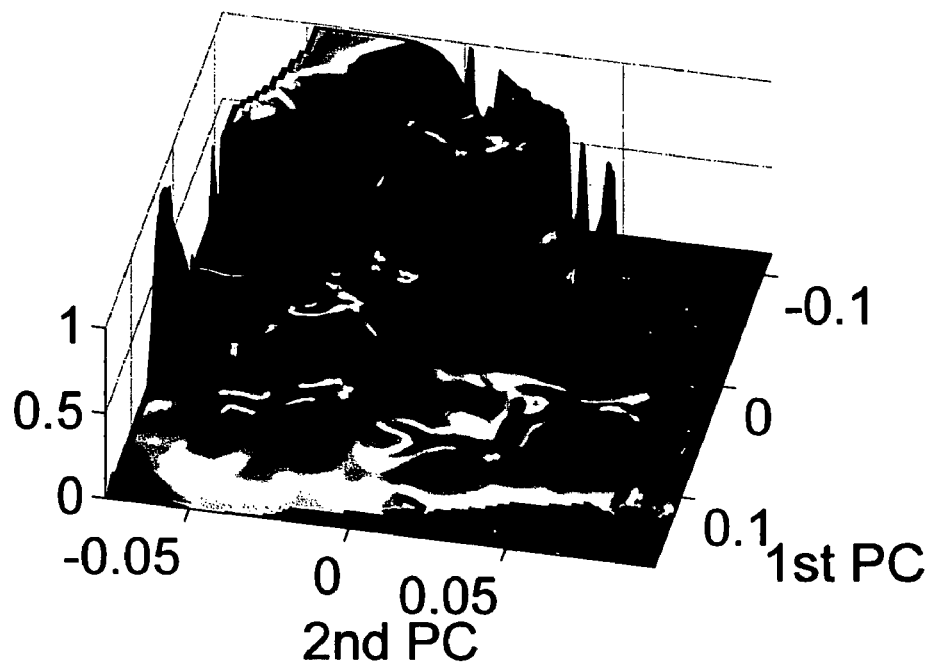
FIGS. 5A-5C are graphical representations of Bayes probabilities for the three embryo classes calculated from FIGS. 3A-3C.
Figure 5B:
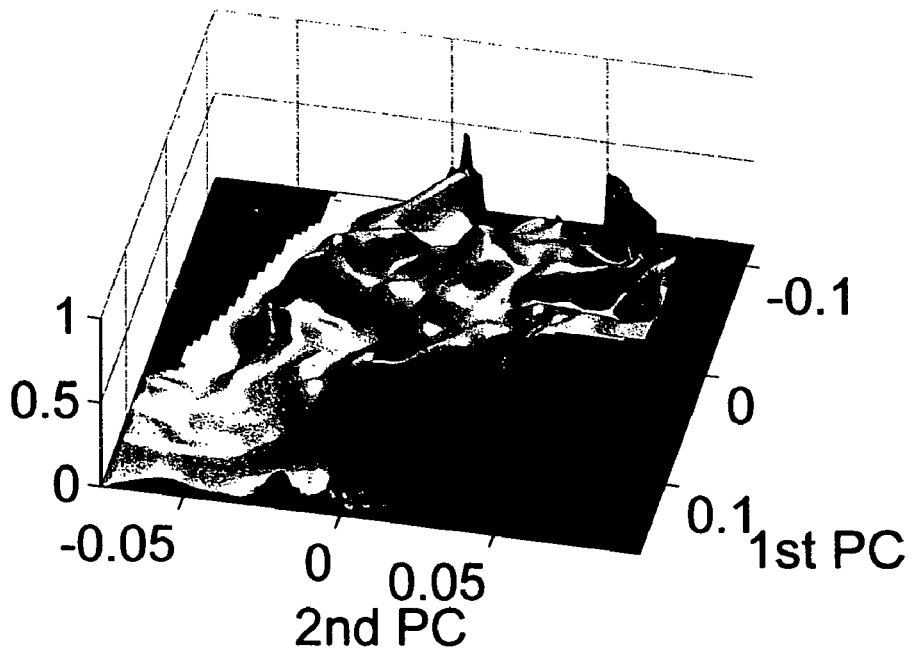
Figure 5C:
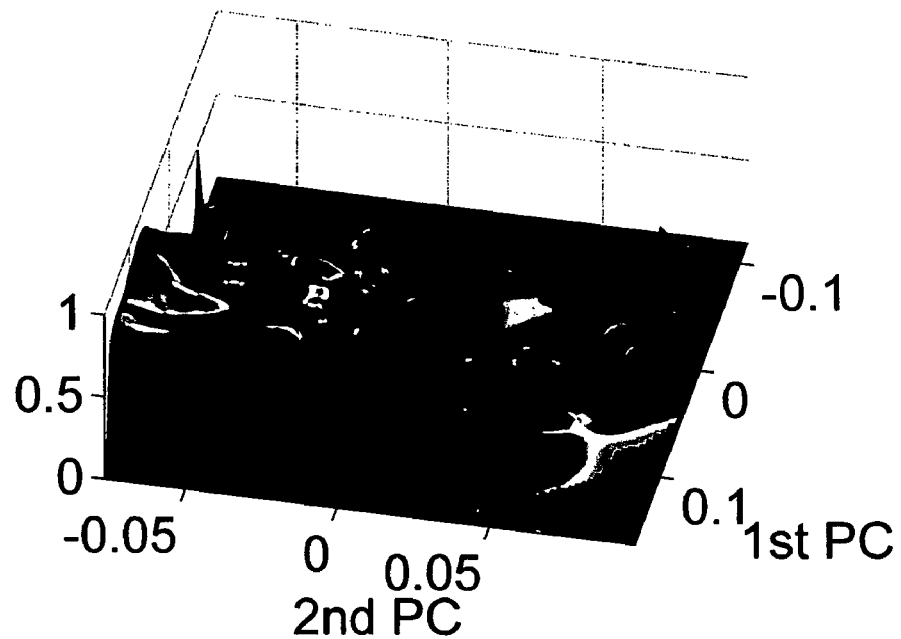
Figure 6:
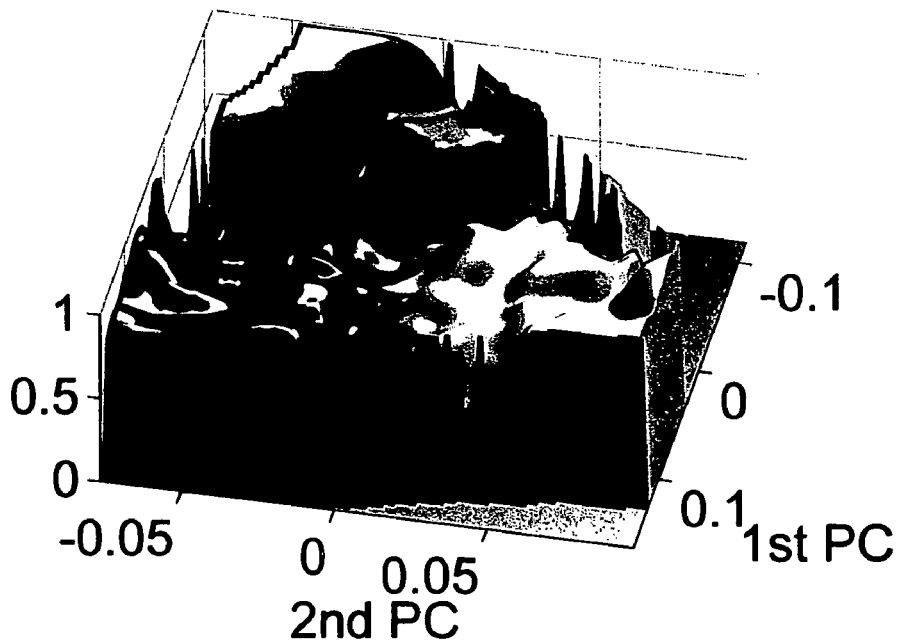
FIG. 6 is a graphical representation of the Bayes probabilities superimposed on each other.

A weighted Parzen-Bayes classifier based on the two-dimensional smoothed histograms from the principal components calculated from the training data set was used to classify new embryos of unknown quality. The smoothed histograms are created by taking the first two training set principal components and normalizing them to range from zero to one by subtracting their minimum and dividing by their range. The upper bound of 1 is reduced by subtracting machine $\epsilon$. The results are multiplied by 101 and rounded down to the next smallest integer. From the intergized principal components, a 101×101 matrix of counts is made using the intergized principal components as indices into the matrix and the counts of a number of replicates of each distinct index pair. The histogram is smoothed with a Gaussian smoothing kernel 21 matrix elements wide and using a standard deviation of 21/9. Each smoothed histogram is divided by its double sum. FIGS. 3A-3C are histograms representing the principal components of the predicted class membership probabilities for genotype B. FIG. 4 is a representation of the histograms of FIGS. 3A-3C superimposed on each other. The dark lines separate the portions of the histograms representing the respective embryo classes. FIGS. 5A to 5C are graphical representations of Bayes probabilities for the three embryo classes calculated from the histograms of FIGS. 3A to FIG. 3C. FIG. 6 is graphical representation of the Bayes probabilities superimposed on each other with the dark lines separating the respective class probabilities.

The results from classifying somatic embryos in the test samples from three genotypes are given below. The results reported in the tables below are based on 100 repetitions of randomly selecting 15% of the data as test data and using the rest to estimate the classifier as outline above, and then passing the test data through the classifier. The tables list the percentage of embryos in each germination or vigor class passed by the classification model developed in accordance with the present invention subject to the constraint that no more than 10% of the total number of embryos passed as embryos that will germinate are actually non-germinants, i.e., 90% of the embryos passed by the classification model must germinate.

TABLE 1

Percentage of Embryos in Each Germination Class Classed as Germ Small or Germ Transplantable Subject to the Constraint That 90% of the Passed Embryos Are Germinants

|  | Nongerm | Germ Small | Germ Transplantable |
| --- | --- | --- | --- |
| Genotype A | 2.24 | 26.87 | 39.57 |
| Genotype B | 6.64 | 47.63 | 77.33 |
| Genotype C | 3.06 | 21.69 | 37.27 |

Embryos can be separated according to morphology into two groups, those with "good" morphology and those with "bad" morphology. Such separation eliminates on average 71%-73% of the non-germinating embryos, 33%-35% of the germ small embryos and 10%-23% of the germ transplantable embryos. When the embryos are prescreened based on morphology, and then classified using the classification method of the present invention, the pass through percentage for 90% pure batches of embryos is given in Table 2, below.

TABLE 2

Percentage of Morphologically Good Embryos in Each Germination Class Classed as Germ Small Transplantable Subject to the Constraint That 90% of the Passed Embryos Are Germinants

|  | Nongerm | Germ Small | Germ Transplantable |
| --- | --- | --- | --- |
| Genotype A | 18.52 | 72.34 | 73.79 |
| Genotype B | 28.67 | 84.22 | 87.08 |
| Genotype C | 17.81 | 65.16 | 65.88 |

In terms of all the embryos entering a system, combining morphology screening and a classification method developed in accordance with the present invention based on near-infrared spectra, results in an increase in the number of germination capable embryos that pass through the model as compared to using the same model on near-infrared spectra alone. This is evident by comparing Table 3, below, with Table 1.

TABLE 3

Percentage of All Embryos in Each Germination Class Classed as Germ Small or Germ Transplantable Subject to the Constraint That 90% of the Passed Embryos Are Germinants and Morphological Prescreen Is Coupled With the New Classification Method Using Near-Infrared Spectra

|  | Nongerm | Germ Small | Germ Transplantable |
| --- | --- | --- | --- |
| Genotype A | 5.40 | 48.58 | 65.41 |
| Genotype B | 7.75 | 56.15 | 78.37 |
| Genotype C | 5.14 | 40.70 | 50.51 |

The present method is preferably implemented using software (computer program) running on a computer to perform the steps of the method. A suitable selection of a computer and coding of the program to carry out the steps of the method would be apparent to one skilled in the art. Any computer language or software that can perform numeric linear algebra could be used to implement the logistic regression fitting algorithm or other classification algorithm according to the present invention. In one embodiment, the algorithm may be implemented in the S language or Matlab.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for developing a classification model for classifying plant embryos according to their quality, the method comprising:
   (a) receiving sets of spectral data of plant embryos of known quality, each set of spectral data of a plant embryo of known quality being associated with one of multiple class labels according to the known quality of the corresponding embryo from which the set of spectral data of the plant embryo of known quality is obtained;
   (b) filtering, using a plurality of filters, the received sets of spectral data of the plant embryos of known quality to provide sets of filtered spectral data values of the plant embryos of known quality, each set of filtered spectral data values of the plant embryo of known quality being associated with one of the multiple class labels according to the known quality of the corresponding embryo from which the set of filtered spectral data values of the plant embryo of known quality values is derived, wherein the filtering comprises:
      (i) for each filter, linearly combining spectral data values over a band of wavelengths to provide linearly combined spectral data values;
      (ii) identifying those filters that best discriminate between different embryo class labels based on cumulative distribution functions estimated at each wavelength for each filter for each embryo class label, to provide sets of best-filtered spectral data values; and
      (iii) reducing the sets of best-filtered spectral data values based on the Smirnov statistics calculated between pairs of embryo class labels at each wavelength for each filter, to provide the sets of filtered spectral data values;
   (c) applying a classification algorithm to the sets of filtered spectral data values of the plant embryos of known quality and their corresponding class labels to develop the classification model; and
   (d) outputting the developed classification model to a user for use in classifying embryos according to their quality, wherein all of the steps are performed on a computer.

2. The method of claim 1, further comprising, between step (a) and step (b), the step of pre-processing the received sets of spectral data of the plant embryos of known quality before the filtering step.

3. The method of claim 1, wherein the classification algorithm comprises a logistic regression.

4. The method of claim 1, wherein there are three or more class labels.

5. The method of claim 1, wherein the plant is a tree.

6. The method of claim 5, wherein the tree is a member of the order *Coniferales*.

7. The method of claim 6, wherein the tree is a member of the family *Pinaceae*.

8. The method of claim 1, wherein the plant embryos are plant somatic embryos.

9. The method of claim 1, further comprising, after step (d), the steps of:
   (e) acquiring spectral data of a plant embryo of unknown quality;
   (f) filtering the spectral data of the plant embryo of unknown quality using one or more of a plurality of filters; and
   (g) applying the classification model to the filtered spectral data values of the plant embryo of unknown quality to classify the same.

10. An article comprising a computer-readable storage medium including computer-executable instructions, wherein the instructions when loaded onto a computer perform the steps comprising:
    (a) receiving sets of filtered spectral data of plant embryos of known quality, each set of filtered spectral data of a plant embryo of known quality being associated with one of multiple class labels according to the known quality of the corresponding embryo from which the set of filtered spectral data of the plant embryo of known quality is obtained, wherein the sets of filtered spectral data are provided based on filtering using a plurality of filters comprising the steps including:
       (i) for each filter, linearly combining spectral data over a band of wavelengths to provide linearly combined spectral data;
       (ii) identifying those filters that best discriminate between different embryo class labels based on cumulative distribution functions estimated at each wavelength for each filter for each embryo class label, to provide sets of best-filtered spectral data; and
       (iii) reducing the sets of best-filtered spectral data based on the Smirnov statistics calculated between pairs of embryo class labels at each wavelength for each filter, to provide the sets of filtered spectral data;
    (b) applying a classification algorithm to the sets of filtered spectral data of embryos of known quality and their corresponding class labels to develop a classification model; and
    (c) outputting the developed classification model to a user for use in classifying embryos according to their quality.

11. The article of claim 10, wherein the instructions further perform the steps of selecting a portion of the filtered spectral data of the plant embryos of known quality and applying the classification algorithm to the portion of filtered spectral data of embryos of known quality and their corresponding class labels to develop the classification model.

12. The article of claim 10, wherein the instructions further perform the step of applying the classification model to filtered spectral data of a plant embryo of unknown quality to classify the same.

13. The article of claim 10, wherein the instructions further perform the step of filtering spectral data of a plant embryo of unknown quality to provide the filtered image spectral data of the plant embryo of unknown quality.

* * * * *